(12) United States Patent
Chiou et al.

(10) Patent No.: US 6,700,093 B2
(45) Date of Patent: Mar. 2, 2004

(54) DIELECTRIC BARRIER DISCHARGE APPARATUS AND MODULE FOR PERFLUOROCOMPOUND ABATEMENT

(75) Inventors: Shin-Fu Chiou, Keelung (TW); Gen-Hou Leu, Taipei (TW); Sheng-Jen Yu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 53 days.

(21) Appl. No.: 10/183,665

(22) Filed: Jun. 28, 2002

(65) Prior Publication Data

US 2003/0116541 A1 Jun. 26, 2003

(30) Foreign Application Priority Data

Dec. 20, 2001 (TW) ........................ 90131747 A

(51) Int. Cl.[7] .................. B23K 9/00; C01C 1/00
(52) U.S. Cl. ................ 219/121.55; 219/121.51; 423/352; 423/240 R
(58) Field of Search .............. 219/121.11, 121.36, 219/121.48, 121.5, 121.51, 121.54, 121.55; 588/210, 211, 212, 205, 248; 423/240 R, 241, 215.5, 352

(56) References Cited

U.S. PATENT DOCUMENTS

| | | | |
|---|---|---|---|
| 5,387,775 A | 2/1995 | Kang | |
| 5,637,279 A | 6/1997 | Besen et al. | |
| 5,750,823 A * | 5/1998 | Wofford et al. | 588/210 |
| 5,932,180 A | 8/1999 | Zhang et al. | |
| 6,007,785 A | 12/1999 | Liou | |
| 6,045,761 A | 4/2000 | Bill et al. | |
| 6,146,599 A | 11/2000 | Ruan et al. | |
| 6,245,299 B1 | 6/2001 | Shiloh et al. | |
| 6,423,284 B1 * | 7/2002 | Arno et al. | 423/240 R |
| 6,471,932 B1 * | 10/2002 | Gieshoff et al. | 423/352 |
| 6,620,394 B2 * | 9/2003 | Uhm et al. | 423/240 R |

* cited by examiner

Primary Examiner—Tu Ba Hoang
(74) Attorney, Agent, or Firm—Birch, Stewart, Kolasch & Birch, LLP

(57) ABSTRACT

A dielectric barrier discharge apparatus and module for perfluorocompound (PFC) abatement. The apparatus includes a housing, first dielectric tube disposed in the housing, a second dielectric tube disposed in the first dielectric tube, and at least one electrode disposed in the housing. By this arrangement, a first cooling gas passage is formed between the housing and the first dielectric tube, a PFC passage is formed between the first and second dielectric tubes, and a second cooling gas passage is formed in the second dielectric tube. When the applied voltage for the electrodes is greater than a breakdown voltage, high energetic electrons generated in the PFC passage can ionize or dissociate the PFC to be removed. Meanwhile, cooling gas is introduced to the cooling gas passage for cooling the electrodes. A dielectric barrier discharge module composed of a plurality of dielectric barrier discharge apparatuses is provided to promote the capacity of the treatment of PFC gases.

8 Claims, 6 Drawing Sheets

DIELECTRIC BARRIER DISCHARGE APPARATUS AND MODULE FOR PERFLUOROCOMPOUND ABATEMENT

BACKGROUND OF THE INVENTION

1. Field of the Invention

The present invention relates to a dielectric barrier discharge apparatus for perfluorocompound (PFC) abatement and a dielectric barrier discharge module composed of a plurality of dielectric barrier discharge apparatuses.

2. Description of the Prior Art

Since the 1992 United Nations Framework Convention on Climate Change (UNFCCC), reduction of the emission rates of processed gases believed to contribute to global warming has become a worldwide issue. Also, according to the agreement of the "Tokyo Conference", each participating country must improve the emission rates of released industrial gases, such as $CO_2$, $CH_4$, NO, HFC, and PFCs, to a set of predetermined levels. Semiconductor associations of the Unite States, Japan, and Europe have promised to decrease the emission rates of PFCs to 90% of the 1995 level before 2010. It has become extremely important for industry to reduce the emission rates of perfluorocompounds.

In U.S. Pat. No. 5,387,775, M. Kang proposes a plasma reaction chamber, which comprises a ceramic plate acting as a dielectric barrier and a conductive liquid acting as a grounding electrode. Applying the conductive liquid can abate the hydrofluoric and hydrocyanic acid produced from the plasma reaction.

In U.S. Pat. No. 5,637,279, M. M. Besen and D. K. Smith propose a chamber to produce ozone and reacting gases, and a system thereof. The apparatus comprises a plasma reacting chamber assembled by welding, and cooling channels. Cooling liquid is introduced to cool the electrodes, and the plasma reacting chamber is modular.

In U.S. Pat. No. 5,932,180, the continuous application of U.S. Pat. No. 5,932,180, X. Zhang et al propose a method to process the surface of the plate electrodes, wherein wolfram (W) is applied.

In U.S. Pat. No. 6,007,785, H. T. Liou proposes a high efficiency ozone-generating apparatus. The Compressure of inflow gases is maintained at less than 1 atm.

In U.S. Pat. No. 6,045,761, A. Bill et al propose a discharge reactor and an application thereof. The apparatus comprises an apertured dielectric barrier, wherein the surfaces of the apertures are coated with a metallic oxide to enhance the chemical reaction of the plasma in the apertures.

In U.S. Pat. No. 6,146,599, R. R. Ruan et al propose a dielectric barrier discharge system and a method to abate the toxic compounds in fluids, wherein a modular dielectric barrier discharge system is applied.

In U.S. Pat. No. 6,245,299, J. Shilon et al propose a modular dielectric barrier discharge system for pollutant abatement. Each dielectric barrier discharge chamber is connected to an independent power supply. The process gases are introduced to one of the dielectric barrier discharge chambers and then to another. Each of the dielectric barrier discharge chambers is provided with power with a voltage range from 300V to 100 kV and an RF frequency range from 10 kHz to 3 MHz. Each of the dielectric barrier discharge chambers comprises inner and outer dielectric barriers arranged to provide a gap for the passage of gases, and plasma generated in the gap. The dielectric barrier is aluminum oxide or quartz.

SUMMARY OF THE INVENTION

A purpose of the present invention is to provide an innovative dielectric barrier discharge apparatus and the module thereof, wherein dielectric barrier discharge plasma (DBD plasma) is applied to enhance the destruction and removal of perfluorocompound.

Another purpose of the present invention is to provide a dielectric barrier discharge apparatus impervious to corrosive gases, such as hydrofluoric acid or fluorine. Furthermore, the apparatus of the present invention is convenient to assemble.

A further purpose of the present invention is to provide a module comprising a plurality of dielectric barrier discharge apparatuses, wherein the capacity of perfluorocompound treatment is adjustable, according to the flow rate of perfluorocompound gases.

The dielectric barrier discharge apparatus of the present invention comprises a housing, a first dielectric tube disposed in the housing, a second dielectric tube disposed in the first dielectric tube, and at least one electrode disposed in the housing. A first cooling gas passage is formed between the housing and the first dielectric tube, a PFC passage is formed between the first and second dielectric tubes, and a second cooling gas passage connected to the first cooling gas passage is formed in the second dielectric tube. While the applied voltage for the electrodes is greater than a breakdown voltage, high energy electrons generated in the PFC passage can ionize or dissociate the PFCs to be removed. The first and second dielectric tubes are ceramic, and are impervious to corrosive gases, such as hydrofluoric acid or fluorine transformed from the perfluorocompound. The first and second cooling gas passages are used to introduce cooling gas to cool the electrodes.

BRIEF DESCRIPTION OF THE DRAWINGS

The present invention is fully understood from the following detailed description and preferred embodiment with reference to the accompanying drawings in which.

DETAILED DESCRIPTION OF THE INVENTION

Figure 1:
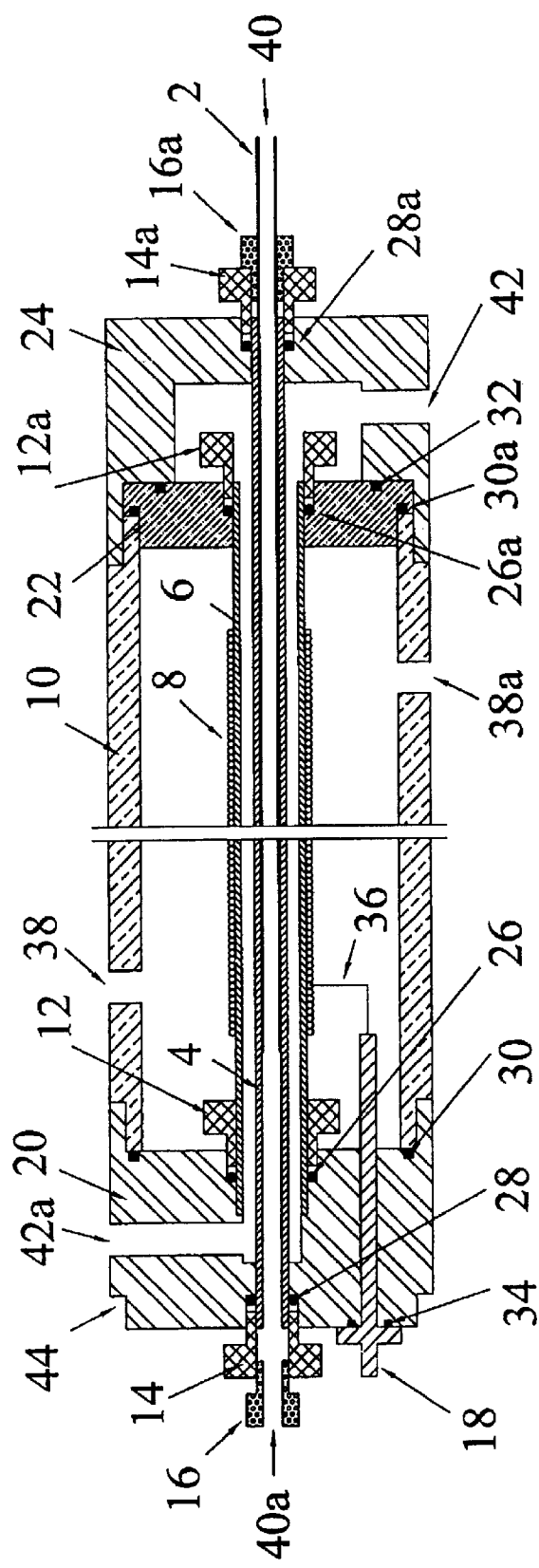
FIG. 1 is a schematic diagram according to the dielectric barrier discharge apparatus of the present invention.

FIG. 1 is a schematic diagram according to the dielectric barrier discharge apparatus of the present invention. As shown in the diagram, the components of the dielectric barrier discharge apparatus are all available by manufacture with traditional technologies, making it easy to assemble or replace the components. As well, the fabrication time required is reduced. Basically, the dielectric barrier discharge apparatus 1 of the present invention is comprised of two dielectric tubes 4, 6, disposed concentrically in the tubular housing 10. A cooling gas passage is formed in the space between the tubular housing 10 and the outer dielectric tube 6, a PFC passage is formed between the inner and outer dielectric tubes 4, 6, and another cooling gas passage is also formed inside the inner dielectric tube 4. A wire-shaped outer electrode 8 is coiled around the outer surface of the outer dielectric tube 6, and a tubular inner electrode 2 is disposed along the inner surface of the inner dielectric tube 4. When the electrodes are applied with predetermined voltage, the PFCs introduced into the passage is broken down, ionized, and turned into plasma, whereby they are removed. In the present embodiment, the inner and outer dielectric tubes 4, 6 are ceramic, e.g. Aluminum oxide with purity above 95%, such that they are impervious to the effects of corrosive gases transformed from the PFCs, e.g. hydrofluoric acid or fluorine gas. The dielectric barrier discharge apparatus is further described here:

(1) PFC passage: Process gas comprising PFCs is introduced to the dielectric barrier discharge apparatus 1 via an opening 42. The process gas is then transformed through the plasma region formed between the inner and outer dielectric tubes 4, 6, and is finally discharged via an opening 42*a*.

(2) Cooling gas passage: Cooling gas is introduced to the dielectric barrier discharge apparatus 1 via an opening 38 to refrigerate the outer electrode 8, and is then discharged via an opening 38*a*. The opening 38*a* is connected to an opening 40 with an outer gas passage (not shown), whereby the cooling gas discharged via the opening 38*a* is again introduced via the opening 40 to refrigerate the inner electrode 2. The cooling gas is finally discharged via an opening 40*a*.

Assembly of the dielectric barrier discharge apparatus comprises the following steps:

(1) Connecting the outer dielectric tube 6, with the outer electrode 8 coiled around it, to a lower cover 20.

(2) Installing an ring 26, and compressing the o-ring by means of a fixing sheath 12 for sealing purposes.

(3) Installing an o-ring 34 to an O-ring groove of the lower cover 20, then mounting a conductive element 18 to the lover cover 20. For sealing purposes, the conductive element 18 is comprised of a fixing structure (not shown) compressing the o-ring 34 as the conductive element 18 is mounted.

(4) Connecting the conductive element 18 to the outer electrode 8 by means of another structure (not shown) adapted to connect a conducting wire 36. The conductive element 18 is further comprised of a structure (not shown) adapted to connect an outer leading wire outside the conductive element 18.

(5) Installing an o-ring 30 to an O-ring groove of the lower cover 20, then connecting the housing 10 to the lower cover 20, compressing the o-ring 30 to provide a sealing effect.

(6) Connecting a centering element 22 comprising an o-ring 30*a* to the housing 10.

(7) Installing an o-ring 26*a* to an O-ring groove of the centering element 22, compressing the o-ring 26*a* by means of a fixing sheath 12*a* for sealing purposes.

(8) Installing an o-ring 32 to an O-ring groove of the centering element 22, and screwing and connecting an upper cover 24 to the housing 10, thereby compressing the o-ring 30*a* and 32 for sealing purposes.

(9) Installing the inner dielectric tube.

(10) Installing o-ring 28 and 28*a*, compressing the O-rings by fixing sheaths 14 and 14*a* respectively for sealing purposes.

(11) Installing connecters 16 and 16*a* to prevent the dielectric tube 4 from sliding. The connecter 16*a* may be used to locate the inner electrode 2 appropriately to improve the sealing effect.

The outer surface of the tubular inner electrode 2 may be comprised of a structure (not shown) adapted to connect an outer leading wire.

The sealing effect is obtained in the present invention. Furthermore, to provide a uniform and stable discharge of the electrodes, it is preferable to unify the gaps between the inner and outer dielectric tubes.

Figure 2:
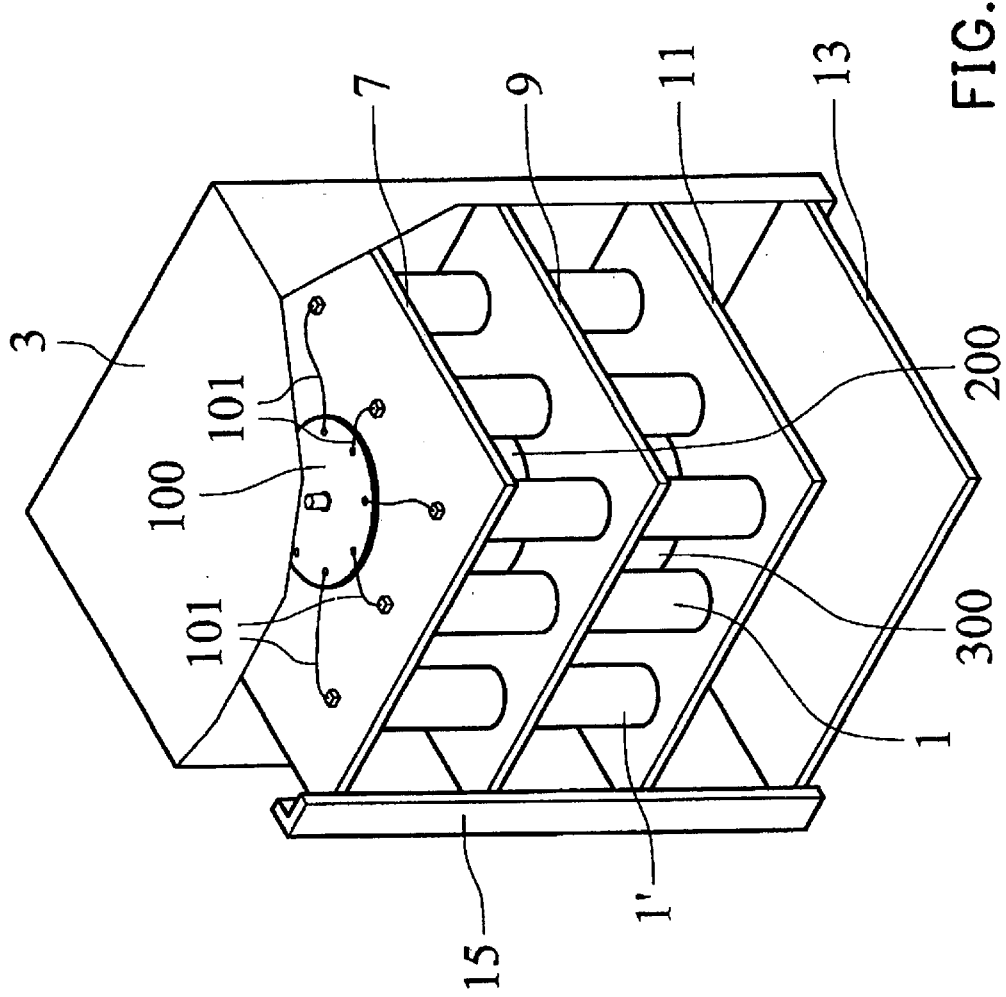
FIG. 2 is a perspective view according to the dielectric barrier discharge module of the present invention.

Moreover, the dielectric barrier discharge apparatus of the present invention is provided with dual-gas passages, accepting PFCs and cooling gas passages, isolated from each other. Several of the apparatuses of the present invention are therefore easily combined, i.e. modularly operated, with their gas passages connected together. The modular design of the present invention is further described here:

FIG. 2 is a perspective view according to the dielectric barrier discharge module of the present invention. For clearness, many of the pipes connected between the dielectric barrier discharge apparatuses 1, 1' . . . are omitted in the figure. As shown in FIG. 2, the dielectric barrier discharge module is comprised of a frame including a base 13 and pillars 15, an isolating cover 3, a first partition 7, a second partition 9, a third partition 11, a high-voltage distributing element 100 disposed on the first partition 7, a gas-distributing element 200 disposed on the second partition 9, a gas-gathering element 300 disposed on the third partition 11, and a plurality of dielectric barrier discharge apparatuses 1, 1' . . . positioned through the second partition 9, and supported by the third partition 11.

The dielectric barrier discharge apparatuses 1, 1' . . . are connected, via their inner electrodes 2, in parallel by the high-voltage distributing element 100. Moreover, an outer leading wire connects each of the conductive elements 18 of the dielectric barrier discharge apparatuses 1, 1' . . . in common, and leads the connection to the third partition 11 used as a grounding element. The energy required to generate the plasma is thereby supplied to the apparatuses.

Figure 3:
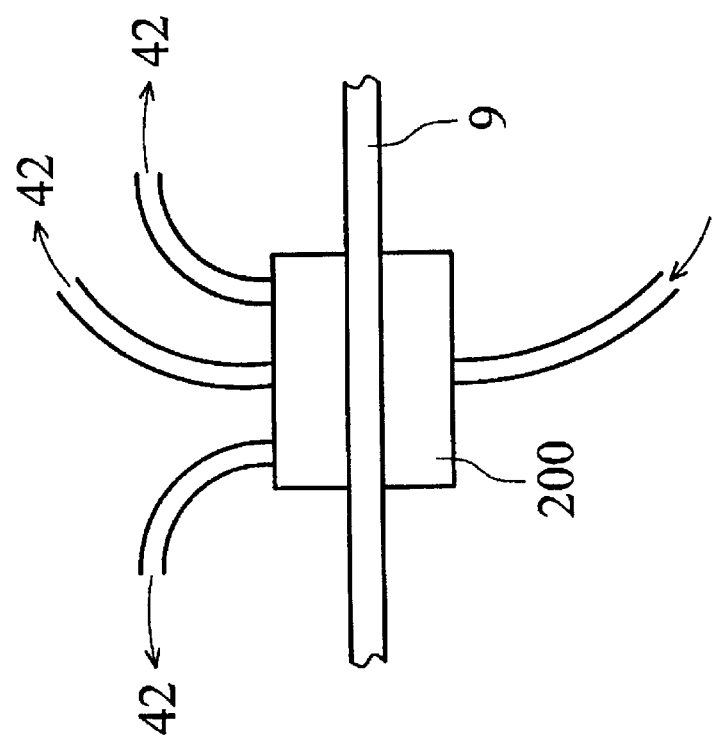
FIG. 3 is a schematic diagram illustrating the gas distribute element provided in the present invention.

Refer to FIG. 3. Via the openings 42, the dielectric barrier discharge apparatuses are connected in common with the gas-distributing element 200, thereby distributing the PFC gas to each of the dielectric barrier discharge apparatuses 1, 1' . . . .

Figure 4:
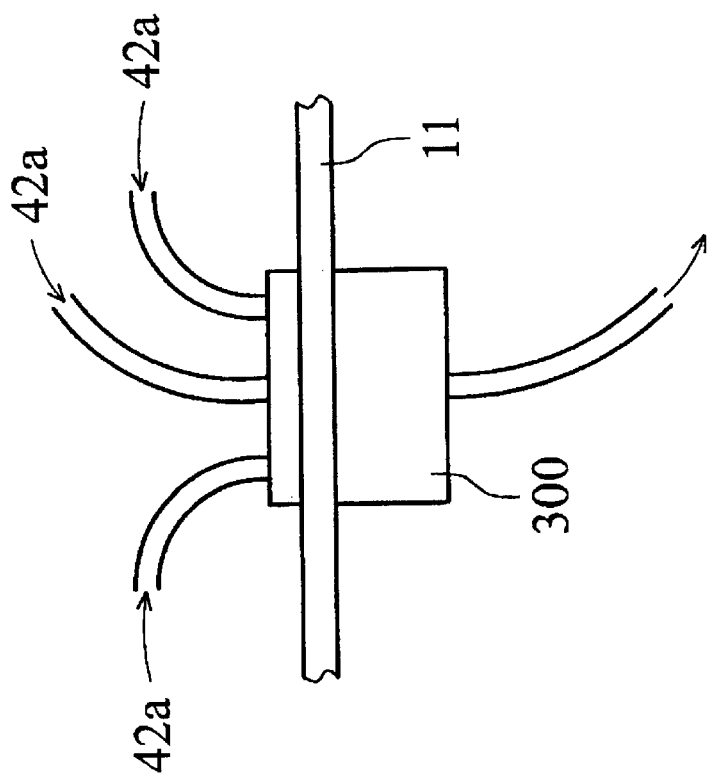
FIG. 4 is a schematic diagram illustrating the gas converge element provided in the present invention.

Refer to FIG. 4. Via the openings 42*a*, the dielectric barrier discharge apparatuses are connected in common with the gas-gathering element 300, thereby gathering products transformed from the PFCs gas from each of the dielectric barrier discharge apparatuses 1, 1' . . . before discharge.

Figure 5:
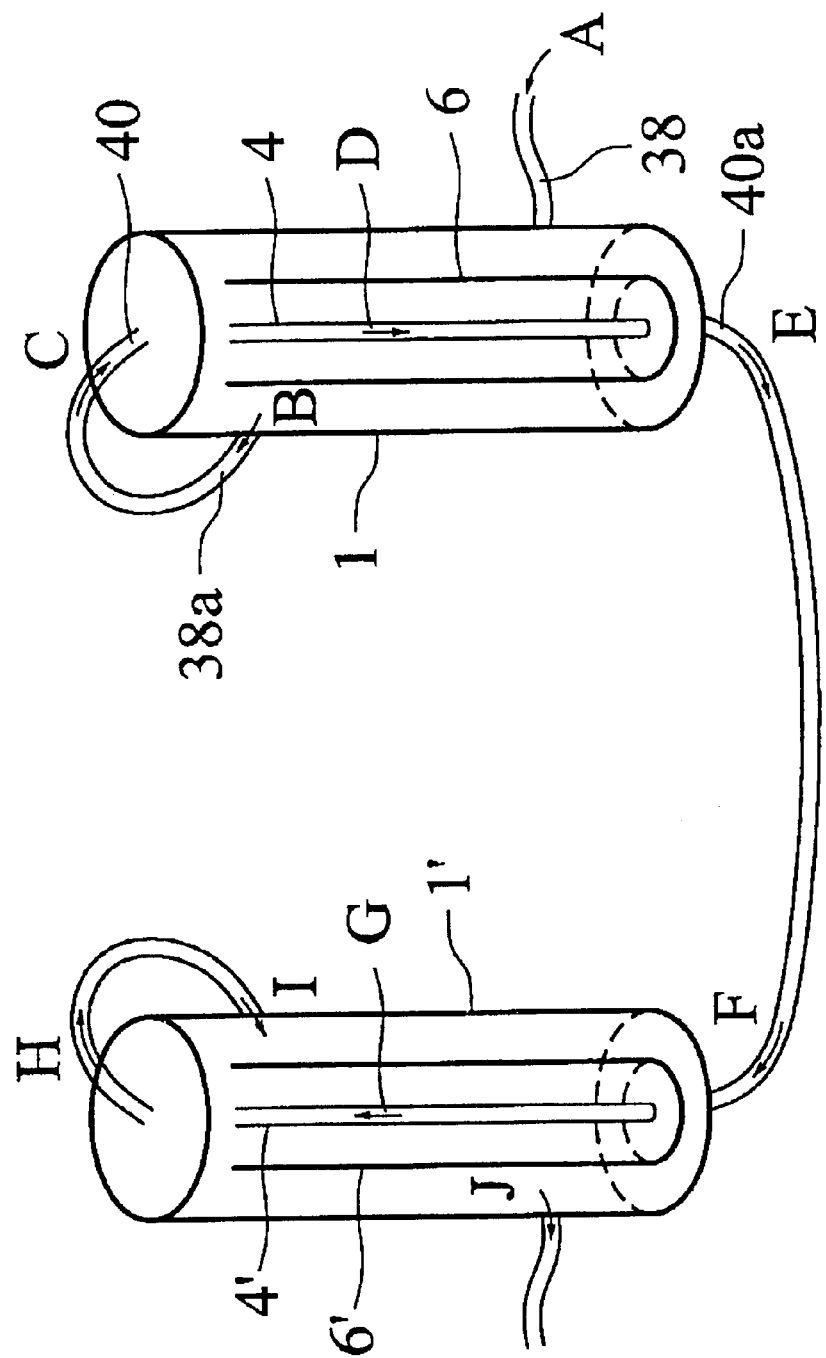
FIG. 5 is a diagram showing the combination of two of the dielectric barrier discharge apparatuses of the present invention, illustrating the flow routes of cooling gas connected in series.

The passages of the cooling gas are developed in a series/parallel arrangement. FIG. 5 is a diagram showing the combination of two of the dielectric barrier discharge apparatuses of the present invention, illustrating the flow routes of cooling gas connected in series. The flow route of the cooling gas follows the order indicated with arrows A, B, C, D, E, F, G, H, I, and J. In the series, for the first dielectric barrier discharge apparatus 1, the outer electrode (disposed around the outer surface of the dielectric tube 6) is cooled prior to the inner electrode (disposed inside the dielectric tube 4). For the second dielectric barrier discharge apparatus 1 in the series, however, the inner electrode is cooled prior to the outer electrode. The cooling order of the third dielectric barrier discharge apparatus is the same as that of the first one, and the cooling order of the fourth dielectric barrier discharge apparatus is the same as that of the second one. The rest may be deduced by analogy.

Figure 6:
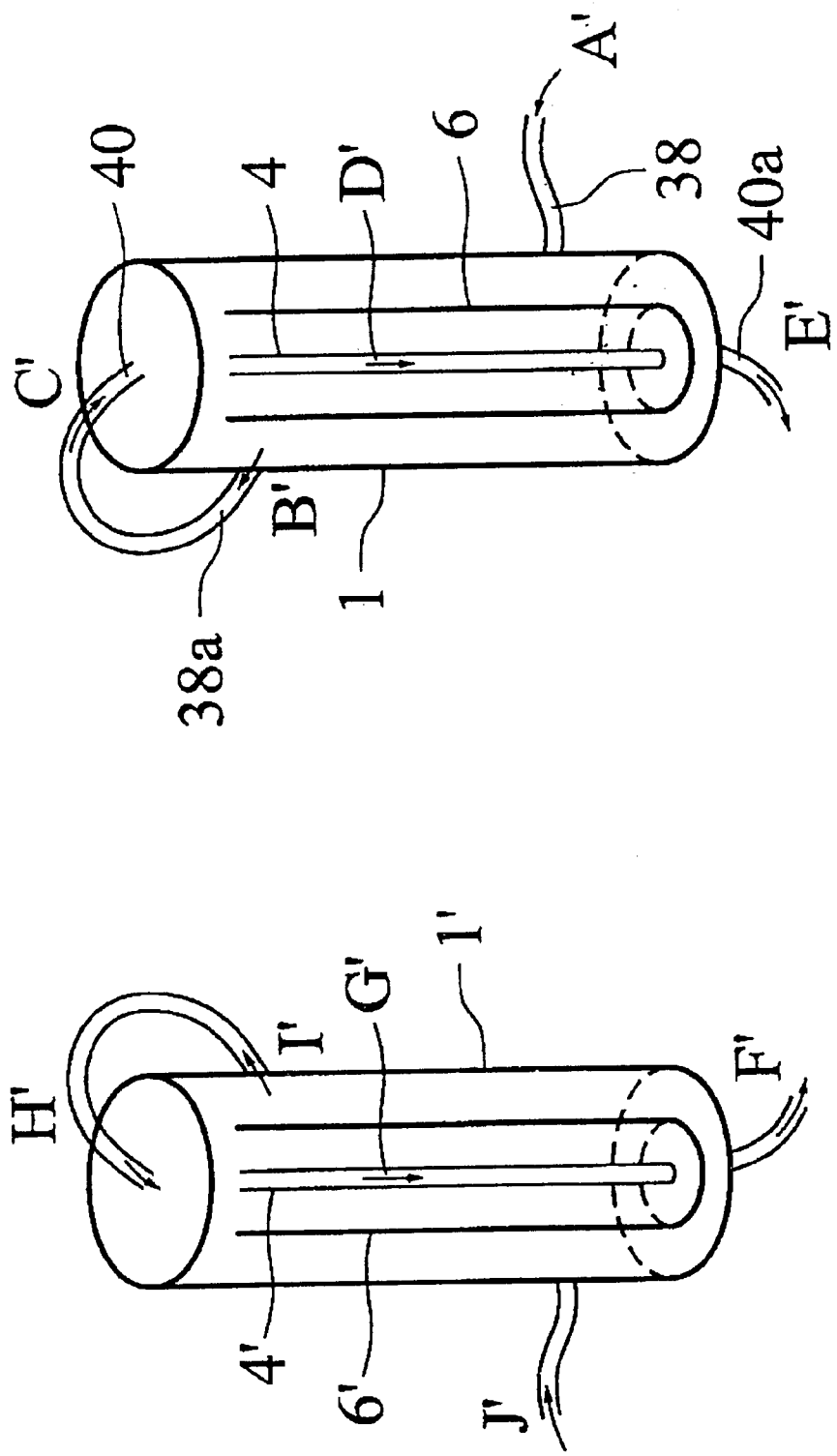
FIG. 6 is a diagram showing the combination of two of the dielectric barrier discharge apparatuses of the present invention, illustrating the flow routes of cooling gas connected in parallel.

FIG. 6 is a diagram showing the combination of two of the dielectric barrier discharge apparatuses of the present invention, illustrating the flow routes of cooling gas connected in parallel. The cooling gas entering the dielectric barrier discharge apparatuses 1 and 1' simultaneously along the arrows A' and J'. The two steams of cooling gas flow along the routes indicated with A', B', C', D', E' and J', I', H', G', F', respectively. The cooling gas cools the two sets of outer electrodes first, and then the inner electrodes.

To optimize cooling efficiency, the choice between abovementioned serial and parallel connections depends on the number of dielectric barrier discharge apparatuses in use.

The procedure of assembling the dielectric barrier discharge module of the present invention and other characters thereof are described below:

(1) Connecting the base 13 and pillars 15 by wielding, whereby developing the frame. The base is disposed with installing holes, such that the module is easily assembled with other systems. The dimension of the frame is determined according to the number of the dielectric barrier discharge apparatuses included in the module.

(2) Fixing the third partition 11 to the pillars 15 with screws. The third partition 11 is comprised of a predetermined number of first installing holes, adapted to connect the third partition 11 to the flange 44 shown in FIG. 1. There is a small hole next to each of the first installing holes, whereby the end of the outer leading wire other than that fixed on the conductive element 18 is connected to the third partition 11. That is, the third partition 11 functions as not only a support element, but also a grounding element that provides a common grounding voltage to the whole module. An opening for installing the gas-gathering element 300 is located in the center of the third partition 11. The gas-gathering element 300 comprises the same number of gas inlets as that of the first installing holes. As assembled, redundant gas inlets may be respectively sealed.

(3) Fixing the second partition 9 to the pillars 15 with screws. The second partition 9 is comprised of a predetermined number of second installing holes. The dimensions of the second installing holes are adapted to those of the dielectric barrier discharge apparatuses. The second partition 9 provides further support and stabilization to the module. An opening for installing the gas-distributing element 200 is located in the center of the second partition 9. The gas-distributing element 200 comprises the same number of gas outlets as that of the first installing holes. As assembled, redundant gas outlets may be respectively sealed.

(4) The first partition 7 is comprised of the same number of concavities and openings as that of the dielectric barrier discharge apparatuses, whereby the first partition is adapted to be fixed on the dielectric barrier discharge module. The first partition 7 is isolating material. The central region of the first partition 7 is disposed with the high-voltage distributing element 100. The high-voltage distributing element 100 distributes and supplies a voltage from an outer leading wire introduced via a leading hole located on the isolating cover 3. The high-voltage distributing element 100 is comprised of a ceramic pad (not shown) used to prevent the heat produced from the high-voltage distributing element 100 first damaging the first partition 7. The ceramic pad can further improve the isolation of the system.

(5) The isolating cover is used to isolate and protect the whole system.

Figure 7:
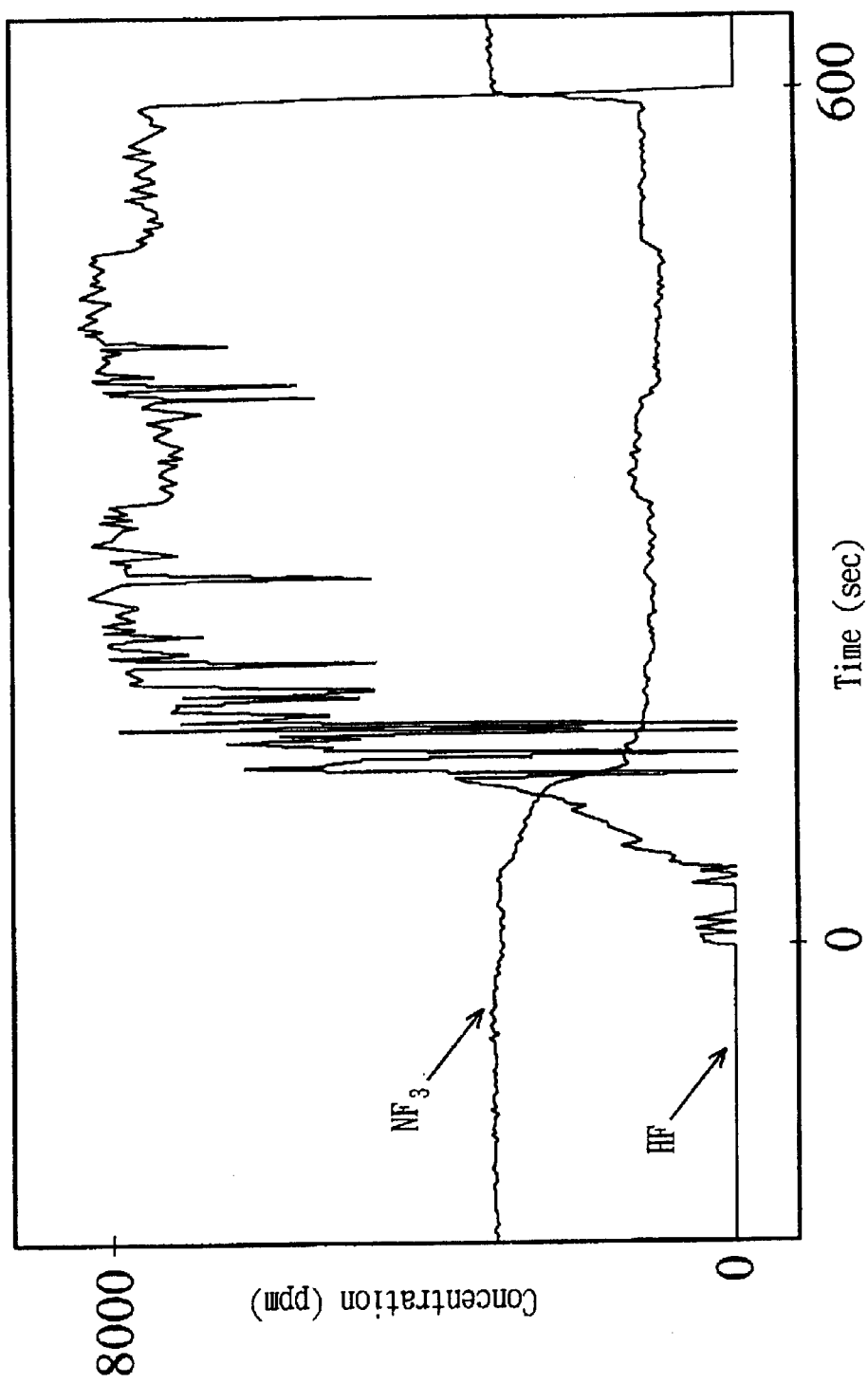
FIG. 7 illustrates the abatement of a kind of perfluorocompound, $NF_3$, with the help of the dielectric barrier discharge apparatuses of the present invention. The result of a qualification according to FTIR spectroscopy is shown in the figure.

FIG. 7 illustrates the abatement of a kind of perfluorocompound, NF3, with the help of the dielectric barrier discharge apparatuses of the present invention. The result of a qualification according to FTIR spectroscopy is shown in the figure. It is obvious that the PFCs are effectively removed using the dielectric barrier discharge module of the present invention.

While the invention has been described with reference to a preferred embodiment, the description is not intended to be construed in a limiting sense. It is therefore contemplated that the appended claims will cover any such modifications or embodiments as may fall within the scope of the invention defined by the following claims and their equivalents.

What is claimed is:

1. A dielectric barrier discharge apparatus, comprising:

a housing;

a first dielectric tube disposed in the housing, whereby a first cooling gas passage is formed between the housing and the first dielectric tube;

a second dielectric tube disposed in the first dielectric tube, whereby a perfluorocompound passage is formed between the first and second dielectric tubes, wherein a perfluorocompound gas is introduced to the perfluorocompound passage, and a second cooling gas passage connected to the first cooling gas passage is formed in the second dielectric tube;

at least one electrode disposed in the housing to introduce electric energy to the electrode, ionizing the perfluorocompound gas to form a plasma; and the cooling gas passage receiving a cooling gas to cool the electrodes.

2. The dielectric barrier discharge apparatus of claim 1, wherein the first and second dielectric tubes are round tubes and are concentric.

3. The dielectric barrier discharge apparatus of claim 1, wherein the first and second dielectric tubes are ceramic.

4. The dielectric barrier discharge apparatus of claim 1, wherein the material of the first and second dielectric tubes is an aluminum oxide.

5. The dielectric barrier discharge apparatus of claim 4, wherein the purity of the aluminum oxide is above 95%.

6. The dielectric barrier discharge apparatus of claim 1, the at least one electrode is plural and comprised of a first electrode disposed outside the first dielectric tube and a second electrode disposed inside the second dielectric tube.

7. The dielectric barrier discharge apparatus of claim 6, wherein the first electrode is wire-shaped and is coiled around the first dielectric tube.

8. The dielectric barrier discharge apparatus of claim 6, wherein the second electrode is tubular and is disposed in the second dielectric tube.

* * * * *